United States Patent
Bogatu et al.

(10) Patent No.: US 9,992,758 B2
(45) Date of Patent: Jun. 5, 2018

(54) SEARCH METHOD AND APPARATUS FOR A COMMUNICATION SYSTEM

(71) Applicants: Tudor Bogatu, Bucharest (RO); Lucian Panduru, Ilfov (RO)

(72) Inventors: Tudor Bogatu, Bucharest (RO); Lucian Panduru, Ilfov (RO)

(73) Assignee: NXP USA, Inc., Austin, TX (US)

( * ) Notice: Subject to any disclaimer, the term of this patent is extended or adjusted under 35 U.S.C. 154(b) by 139 days.

(21) Appl. No.: 14/766,987

(22) PCT Filed: Feb. 15, 2013

(86) PCT No.: PCT/IB2013/051252
§ 371 (c)(1),
(2) Date: Aug. 11, 2015

(87) PCT Pub. No.: WO2014/125335
PCT Pub. Date: Aug. 21, 2014

(65) Prior Publication Data
US 2015/0382316 A1    Dec. 31, 2015

(51) Int. Cl.
*H04W 56/00*    (2009.01)
*H04W 88/08*    (2009.01)

(52) U.S. Cl.
CPC ... *H04W 56/0015* (2013.01); *H04W 56/0085* (2013.01); *H04W 88/08* (2013.01)

(58) Field of Classification Search
None
See application file for complete search history.

(56) References Cited

U.S. PATENT DOCUMENTS

| 4,754,704 A | 7/1988 | Lubbers |
| 6,961,565 B2 | 11/2005 | Tanno et al. |
| 7,599,335 B2 | 10/2009 | Zalio et al. |

(Continued)

FOREIGN PATENT DOCUMENTS

| EP | 1215829 A2 | 6/2002 |
| KR | 1020110017547 | 2/2011 |
| WO | 2006004241 | 1/2006 |

OTHER PUBLICATIONS

International Search Report and Written Opinion correlating to PCT/IB2013/051252 dated Nov. 20, 2013.

(Continued)

*Primary Examiner* — Edan Orgad
*Assistant Examiner* — Saumit Shah (57) ABSTRACT

A method of searching of base stations in a mobile communication system has a first stage of detecting at least one slot boundary, a second stage of detecting at least one frame boundary and a scrambling code group, and a third stage of detecting a scrambling code. Multiple possible base stations are identified by determining a first threshold based on correlation values of correlating the input signal with a primary synchronization channel code. For each hit, the input signal is aligned to the corresponding slot boundary, an average correlation value is based on all correlations with secondary sequences, and a second threshold based on the average correlation value is set. Any delay and codewords that have a correlation value above the second threshold are correlated with the codes in the detected group so as to determine multiple base stations.

15 Claims, 9 Drawing Sheets

(56) References Cited

U.S. PATENT DOCUMENTS

| | | | |
|---|---|---|---|
| 2002/0034944 A1* | 3/2002 | Tanno | H04B 1/7075 |
| | | | 455/434 |
| 2003/0202564 A1 | 10/2003 | Ho et al. | |
| 2004/0022273 A1 | 2/2004 | Jo et al. | |
| 2004/0170221 A1* | 9/2004 | Storm | H04B 1/70735 |
| | | | 375/149 |
| 2004/0223517 A1* | 11/2004 | Rimi | H04B 1/70735 |
| | | | 370/509 |
| 2008/0144583 A1 | 6/2008 | Litwin et al. | |
| 2009/0080372 A1* | 3/2009 | Naka | H04B 1/7083 |
| | | | 370/328 |
| 2010/0142506 A1* | 6/2010 | Chu | H04B 1/7075 |
| | | | 370/342 |
| 2013/0273912 A1* | 10/2013 | Xu | H04W 24/08 |
| | | | 455/434 |
| 2014/0057624 A1* | 2/2014 | Murgan | H04B 1/7087 |
| | | | 455/422.1 |
| 2015/0208328 A1* | 7/2015 | Drugge | H04B 1/7083 |
| | | | 455/434 |

OTHER PUBLICATIONS

Yi-Pin Eric Wang and Tony Ottosson—"Cell Search in W-CDMA"—2000 IEEE vol. 18, Issue:8, pp. 1470-1482.

* cited by examiner

SEARCH METHOD AND APPARATUS FOR A COMMUNICATION SYSTEM

FIELD OF THE INVENTION

This invention relates to a search method and device for a communication system. An example of a cell based mobile communication system is the Wideband Code Division Multiple Access (W-CDMA) system.

BACKGROUND OF THE INVENTION

The U.S. Pat. No. 6,961,565 describes a cell search method and apparatus for mobile station in a mobile communication system. The time required for a cell search and the accuracy of the cell search is modified by determining, during selection of frame boundaries and a scramble code, whether or not the selection results are correct. A mobile station causes descramblers to descramble a received signal with eight scramble codes. Then, a correlator calculates the phases of the scramble codes on the basis of frame boundaries, and de-spreads the signal with a spreading code for a common pilot channel. The mobile station performs this operation over a plurality of symbols, and causes averaging process sections to average the results. Then, a peak detector selects a scramble code with which an average correlation coefficient is largest. This maximum average correlation coefficient is output to a detection results judging section, which then calculates the ratio of this value to a reference value calculated inside the mobile station, thereby judging detection results.

However, the known system is less suitable for detecting multiple base stations.

SUMMARY OF THE INVENTION

The present invention provides a cell search method and apparatus, a computer program product and a semiconductor device as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 1:
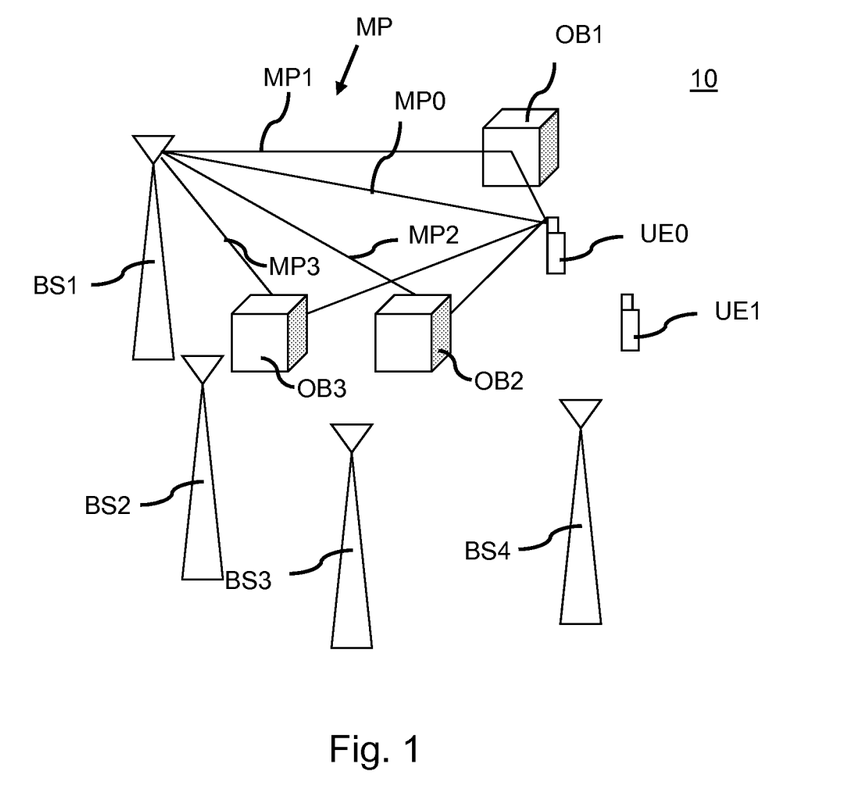
FIG. 1 schematically shows an overview of a mobile communication system.

FIG. 1 schematically shows an overview of a mobile communication system. It is noted that in this document a W-CDMA system is used as an example, but the proposed search procedure may be used in any similar cell based communication system.

Further developments may include Long Term Evolution (LTE) which is the most recent step forward in cellular 3G services. LTE is a 3GPP standard. The LTE physical layer is an efficient means of conveying both data and control information between a base station (NodeB) and mobile user equipment (UE).

FIG. 1 shows multiple base stations BS1, BS2, BS3, BS4, each base station serving a respective area also called cell. Also a first user equipment (UE) UE0, a second UE UE1 and three objects OB1, OB2, OB3 are shown. FIG. 1 further shows that base station BS1 is transmitting or receiving a signal to or from the user device UE0 via a plurality MP of paths. The plurality of paths comprises a direct path MP0 along the line of sight from the UE UE0 to the base station BS, as well as three reflections MP1, MP2, MP3 along which the signal experiences reflections on the objects OB1, OB2, OB3. As each path MP0, MP1, MP2, MP3 has a different length, the reflections are received by the receiver with different delay and possibly with different phase shifts. The plurality of paths may further be referred to as a plurality of reflections. The receiver assigns a plurality of fingers to de-spread and descramble its received signals, depending on detected reflections according to a channel estimation procedure. The spreading allows transmitting multiple physical channels concurrently while allowing separation of different physical channels of the same source in the receiver. For example, the UE can transmit a Dedicated Physical Control Channel (DPCCH) and a Dedicated Physical Data Channel (DPDCH) at the same time, such that PILOT symbols of the DPCCH channel can be used to execute channel estimation in the base station and maximum ratio combining (MRC), for example, on data symbols of the DPDCH channel. The skilled person will appreciate that, since DPCCH and DPDCH transmitted at the same time they use exactly the same fingers. Thus, a scrambling code is used to distinguish between the different UEs and BSs.

In such a communication system, there may be a need to detect multiple base stations which are received by a device, either a user device (UE) or a base station (NodeB, or BS). For example, NodeBs in a self configurable network must perform a search procedure in order to detect neighboring NodeBs. Such search procedure is commonly called a cell search procedure. A cell is found when the radio frame boundary and scrambling code are known. The procedure makes use of PSCH (Primary Synchronization Channel), SSCH (Secondary Synchronization Channel) and CPICH (Common Pilot Channel), dividing cell search procedure into 3 stages corresponding to the analysis of each channel.

Figure 2:
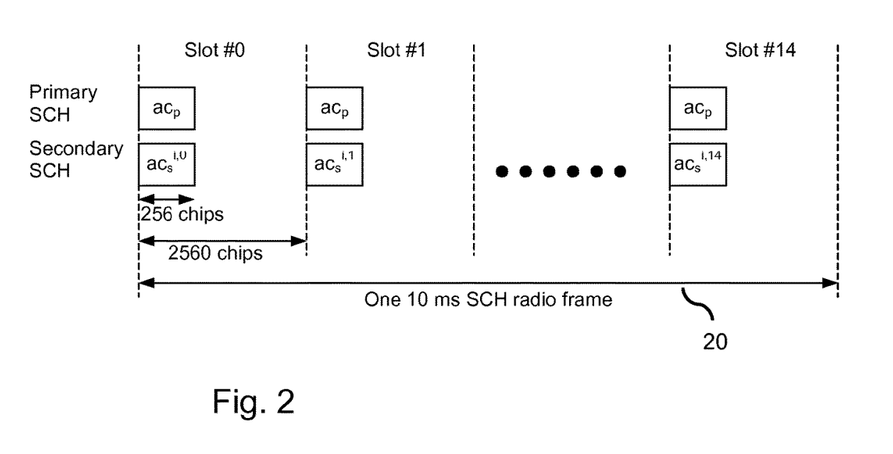
FIG. 2 shows an example of a synchronization channel radio frame.

FIG. 2 shows an example of a synchronization channel radio frame. The radio frame 20 is transferred via a synchronization channel SCH, and has 15 slots (Slot#0 . . . Slot#14) of 2560 chips, totaling to 38400 chips. At the beginning of each slot, 1 unit of 256 chips ($ac_p$) constitute a primary synchronization channel (PSCH) and also 1 unit of 256 chips ($ac_s$) constitute a secondary synchronization channel (SSCH). The rest of 9 units of the slot are empty.

The first stage of the cell search procedure involves detecting a slot boundary by correlating the input signal with the PSCH code and detecting correlation peaks, which indicate a possible BS slot boundary detect.

During the second stage, the algorithm searches for frame boundary and scrambling code group using SSCH. A correlation is done between the slot aligned input signal and every SSCH sequence at every possible frame delay. Correlation peaks identify a frame boundary (by slot and in-slot delay) and code group (by sequence).

The third stage involves detecting the base-station's scrambling code by correlating the frame aligned input signal with a predefined number of scrambling codes, e.g. 8, in the scrambling code group as detected at the second stage.

The input signal may be oversampled (e.g. Over-Sampling-Rate=2 or 4), which enables two options. One is to treat separately each sampling phase to have better aligning. The other is to combine both sampling phases to get better signal to noise ratio (SNR). Given that cell search is basically a synchronization procedure and the sampling circuit is very unlikely to be in phase with the input signal, it's best to separate the different samples corresponding to the same chip.

It is noted that, with the deployment of self-organizing networks, cell search is no longer a user equipment specific procedure, as the search is also performed by base stations, e.g. small cell base stations. Existing cell search solutions are designed for user equipment and focus on detecting only the strongest NodeB on a carrier. NodeBs in self configurable networks need to detect as many neighbors as possible. Although the broad cell search follows similar stages, a different approach is proposed for the broad search scenario. Thereto a method of properly selecting the thresholds is described now.

A method for searching of a base station in a mobile communication system has three stages as discussed above. A first stage involves detecting at least one slot boundary by correlating an input signal with a primary synchronization channel (PSCH) code and detecting at least one correlation peak. A second stage involves detecting at least one frame boundary in accordance with a frame delay and a scrambling code group by correlating a slot aligned input signal aligned to the detected slot boundary with a secondary synchronization channel (SSCH) code, and correlating multiple SSCH sequences at multiple possible frame delays for identifying frame boundaries and identifying a code group by the respective SSCH sequence. A third stage involves detecting a scrambling code by correlating a frame aligned input signal aligned to the frame boundary with the codes in the code group as identified at the second stage.

In the traditional UE case, computational complexity reduction is a priority and can be achieved by selecting high thresholds for all cell search stages, resulting in few or no false detects that have to be eliminated in the scrambling code identification stage.

In the NodeB scenario, the procedure has to detect as many base-stations as possible. As described now this is done by properly selecting thresholds, keeping a balance between the number of detects and computational complexity, while ensuring no false detects in last stage.

The first stage comprises identifying multiple possible base station slot boundaries by determining a first threshold based on correlation values of said correlating the input signal with a primary synchronization channel (PSCH) code, and selecting the possible base station slot boundaries corresponding to delay hits above the first threshold. The first threshold may be based on an average of all correlation values. Optionally, the first stage includes determining the first threshold based on a histogram of bins of correlation values. In the histogram, a bin is selected which is above the average and has zero or a minimum of delay hits. The bin correlation value assigned to that bin is used to set the first threshold. Optionally the bin correlation value is further processed, e.g. scaled or increased by a predetermined factor.

The second stage, for each of said delay hits of the first stage, involves aligning the input signal to the corresponding slot boundary. Subsequently, an average correlation value for all correlations with said SSCH sequences is computed. Then a second threshold is set based on the average correlation value.

The third stage involves processing any delay and codeword that have a correlation value above the second threshold for computing the correlation with the codes in the detected group so as to determine multiple base stations.

An antenna signal is input for the cell search procedure along, optionally with a few parameters that allow adjusting the procedure's behavior. Such parameters may be: high or low thresholds, number of slots to accumulate correlation in the first 2 stages, number of windows to accumulate PSC correlations, number of detects per first stage group, etc.

The first stage involves computing correlation with the PSCH code. Optionally, in the first stage, correlation is computed via two cascaded filters, each filter having a predetermined number of filter coefficients. Optionally, each filter has 16 filter coefficients. The two cascaded filters may be matched to the Gold sequences that generate the PSCH code. The filter output is accumulated on a slot basis (correlations corresponding to the same in-slot delay are accumulated), so non-coherent accumulation is used. The result is a vector of length: 2560 (chips per slot)*OSR (oversampling rate) with the correlation values corresponding to every possible slot boundary.

The correlation may be computed as follows. The PSCH code is a 256 chip sequence generated through a Kronecker product of two 16-chip vectors (refer to 5.2.3.1 in ETSI TS25.213, i.e. 3rd Generation Partnership Project (3GPP); Technical Specification Group Radio Access Network; Spreading and modulation (FDD) (Release 9)).

In this way the correlation can be easily done with two cascaded filters, each with 16 coefficients, instead of one 256 multiply and accumulate block (MAC). This means instead of doing 256 MACs, there are only 16+16 MACs to compute correlation for one delay. Suppose the correlation is done over one frame; that means 2560 values to accumulate over 15 slots resulting in approximately 2.6 MMACs using 2 matched filters instead of 19.6 MMACs for a classic correlation computation. If the used threshold is high and few peaks are further analyzed, this has a great contribution in reducing arithmetic complexity.

In the first stage, a first threshold is computed using a histogram in order to optimize performance. For easier implementation and faster processing, histogram bins may have a width of $2^n$. If so, the histogram may be generated by right shifting all correlation values with n bits and then mapping every value on a bin, because incrementing the bin corresponds to each value. This approach avoids comparisons for every correlation value or sorting them thus being more efficient.

Once the histogram is build the algorithm searches for a histogram bin above average that has 0 hits or minimum hits. This is equivalent to finding a gap between the correlation values that are considered noise and those that correspond to a NodeB.

Figure 3:
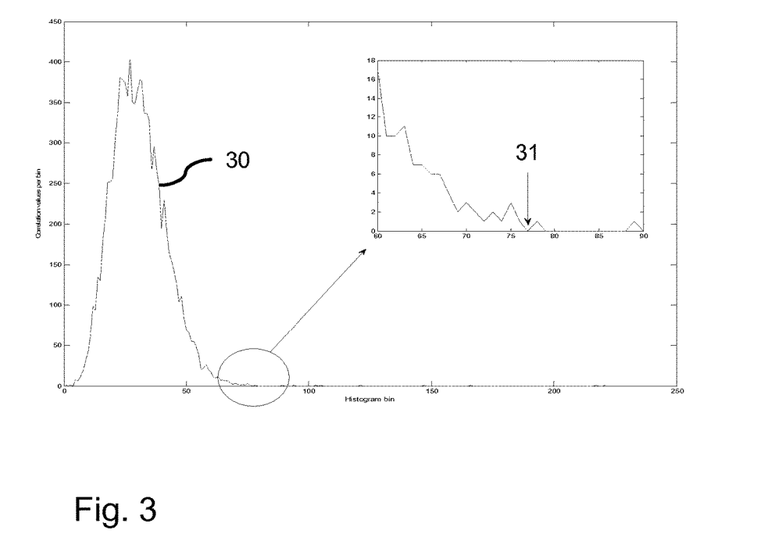
FIG. 3 shows an example of selecting a threshold using a histogram

FIG. 3 shows an example of selecting a threshold using a histogram. In a graph histogram bins are set along the horizontal axis, and the number of correlation values in each bin along the vertical axis. The curve 30 depicts the histogram as determined. In an enlarge section an arrow 31 indicates the histogram bin above average that has 0 hits or minimum hits. The first threshold is based on the correlation value corresponding to that bin. The threshold can be adjusted by using a weighting factor or by choosing different lengths for the histogram.

Optionally, for flexibility in adjusting the threshold in order to be compatible with the extensive cell search, a factor is introduced to move the threshold between histogram peak and found bin. The threshold can also be lowered also by increasing the number of histogram bins (basically shrinking the searched gap in correlation values). If a small factor is chosen and the threshold is closer to histogram peak, the algorithm behaves very similar to weighted average method.

Figure 4:
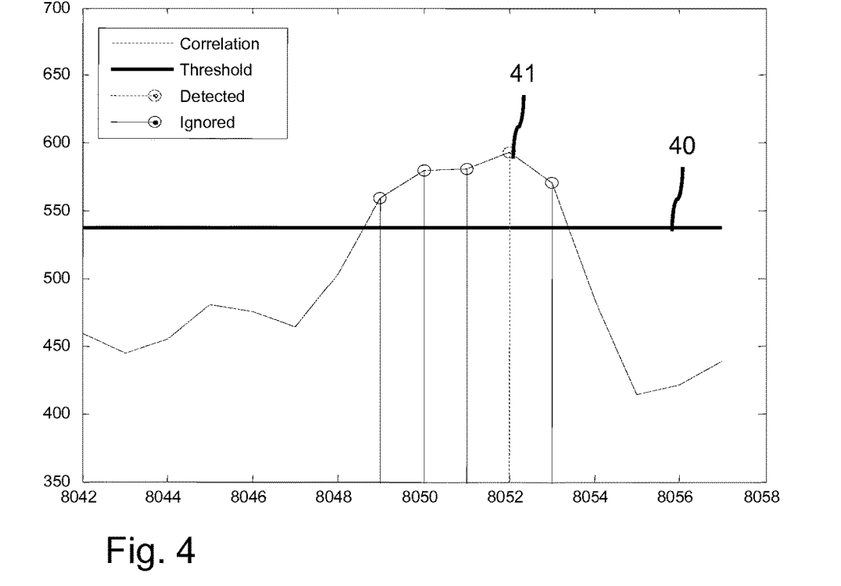
FIG. 4 shows detection of correlation values above a threshold.

FIG. 4 shows detection of correlation values above a threshold. In a graph delay values are set along the horizontal axis, and the correlation values along the vertical axis. The curve 40 depicts the first threshold as determined. The computed threshold 40 is used to detect possible slot boundaries. Optionally, in order to optimize the search when low thresholds are used, only correlation local maximums above threshold are detected, as illustrated by local maximum 41, while the neighbouring correlation values are ignored although they exceed the threshold.

Optionally, the first stage detects (i.e. a delay value corresponding of which the correlation exceeds the first threshold) are grouped and then following stages run for every group. Optionally, detects corresponding to higher correlation values are processed first. Thereto a second histogram may be generated using normalized correlation values of the detects in order to sort the detects.

In the second stage, for every first stage detect, the input signal is aligned to the corresponding slot boundary. Subsequently SSCH codes correlation is computed with every slot and correlation values are combined according to the SSCH codeword table in order to obtain correlation with SSCH code-words. The second stage may be performed for the respective groups of detects as formed in the first stage.

Compared to the traditional UE S-SCH cell search stage, where predefined threshold values can be used (based on Constant False Alarm Rate), a NodeB cell search must compute the threshold at runtime to maximize number of detections while minimizing false detections. Optionally, all S-SCH correlation averages are used (for each detected P-SCH delay) to account for their large variation. Local averaged thresholds (per first stage detected delay) may be used, or an average of all local thresholds. In an experimental example, 4399 detects were found using local threshold versus 1036 detects using the average of all thresholds, while all eliminated peaks proved to be false detects.

For selecting the potential correlation peaks in the second stage a second threshold is formed. After computing correlation with SSCH code-words, a difference compared to the first stage is that there are 960 correlation values for every first stage detected peak (64 code-words*15 slot delays). Optionally, the histogram approach is used to determine the second threshold, which for fast cell search performs good, similar to PSCH detection. For extensive search though, it has been observed that the threshold corresponding to every first stage detect is varying significantly which means that for the same input signal, different second thresholds will be used. In an extensive search this may not be desired because it may introduce extra detects while excluding some possible true detects.

Optionally, the same second threshold is applied to all correlation values from the second stage. An average of all correlation values may be computed and weighted with a factor. Thereto codeword correlation values are accumulated and averaged in order to get the second threshold.

The second threshold is computed by weighting the average. Optionally for grouped first stage detects, the same accumulator may be used for every second stage call for updating the threshold. All delays and code-words that exhibit correlation above the second threshold are processed in the third stage.

In the second stage frame synchronization is performed. Frame boundary detection basically has two steps: correlation with SSCH codes and correlation with SSCH code-words. The first step involves correlating every slot from the slot aligned input signal with every SSCH code. The second step may be implemented in two different ways: one that implies a hard decision after SSCH correlation with every slot and a second that follows a soft decision approach.

The hard decision method proposes that after correlating the 16 SSCH codes with one slot (first 256 chips), a decision has to be made, picking the most correlated code. This is done for all the available slots, forming a code-word. Then the algorithm searches in the applicable code table (e.g. see TS25.213-Table 4) for the closest code-words and their delays. This is a basic algorithm that requires minimum resources. Estimated operations for the analysis of one radio frame:

$N1=15[\text{slots}] \cdot 16 [\text{codes}] \cdot 256[\text{chips}]$ MACs for correlation with SSCH codes, $N2=15[\text{slots}] \cdot 16[\text{codes}]$ comparisons for determining the best matching code for every slot $N3=15[\text{codes}] \cdot 64[\text{codewords}] \cdot 15[\text{delays}]$ MACs for searching the best code-word.

This gives an approximate of 76 KMACs. However, this method has the disadvantage that it makes two "less informed" decisions rather than a single decision having all the correlation information available. Also the second decision has to be made having a very low resolution for the correlation with the code-word table (maximum match is 15, minimum is 0 and the step is 1). This may be a problem when the threshold is lowered for a fine search. If the algorithm is used to search for strong peaks and the target base-station signals have a good SNR, then the limitations of the hard decision method are not significant.

The soft decision method proposes a correlation table for all the code-words (64), all possible delays (frame delays: 0-14) with the slot aligned input signal. After generating this table, the words and delays with correlation above chosen threshold are taken in consideration for the next stage. Without any optimizations the second method may be more time consuming due to the large number of correlations. For one frame the arithmetic complexity would be:

$N=15[\text{slots}] \cdot 64[\text{codewords}] \cdot 15[\text{delays}] \cdot 256[\text{chips}]$ That means 3.7 GMACs. An efficient optimization is to compute correlation with every SSCH code for every slot (just like hard decision method) and then form the correlation matrix by accumulating correlations for every codeword and every delay. This way, the correlation between a code and a slot is calculated only once. In this case, the arithmetic complexity reduces to:

$N1=15[\text{slots}] \cdot 16\ [\text{codes}] \cdot 256[\text{chips}]$ MACs for correlation with SSCH codes, $N2=15[\text{codes}] \cdot 64[\text{codewords}] \cdot 15[\text{delays}]$ accumulations to form the table.

The modified soft decision algorithm reaches same complexity as the one that implements hard decision. The advantage is that only one decision is made at the end, and in the case of lowering the threshold for a fine search, the resolution is much better than the first method. Also, for bad SNR, the correlation peaks are more distinguished.

The third stage has a similar flow for every second stage detect. The input signal is frame aligned, and the correlation is computed with the respective codes, which may be in the detected group. The correlations are accumulated and may be used for computing and updating the second threshold. Finally, for each detected peak, the PSC is detected. Optionally, after the second and third stages are completed, process all groups, the Stage 3 threshold (computed using all PSC correlation values) is used to double check all detected PSCs.

In the scrambling code detection stage, the threshold has to be set so that there are no false detects. In the first two stages the thresholds can be lowered, given that the procedure has to detect as many BSs as possible regardless of their SNR or path attenuation. Lowering thresholds introduces more false detects in the analysis, relying on the third stage to eliminate them, but also increasing the detection possibility for BSs with weaker signal. This leads to computing a large number of correlations with scrambling codes. So the third stage is the final step in detecting a NodeB. Detecting is based on correlation with Primary Scrambling Codes (PSC) transmitted on CPICH physical channel. In the third stage, windows may be used to calculate correlation, as follows.

Due to the length of the scrambling codes, frequency offset has to be taken into account. For example, for a 760 Hz frequency offset, the phase wrap)(360° is achieved after approximately 5052 chips. The scrambling code has 38400 chips. A classic coherent combining of the correlation sum is not a good option in this case. Instead, a non-coherent correlation scheme may be implemented. Correlation will be computed by non-coherent accumulation of correlations computed on several windows.

The window size effectively sets the coherency length. Scrambling codes are pseudo-random codes so the wider the correlation window is, the better the cross-correlation between scrambling codes.

Figure 5:
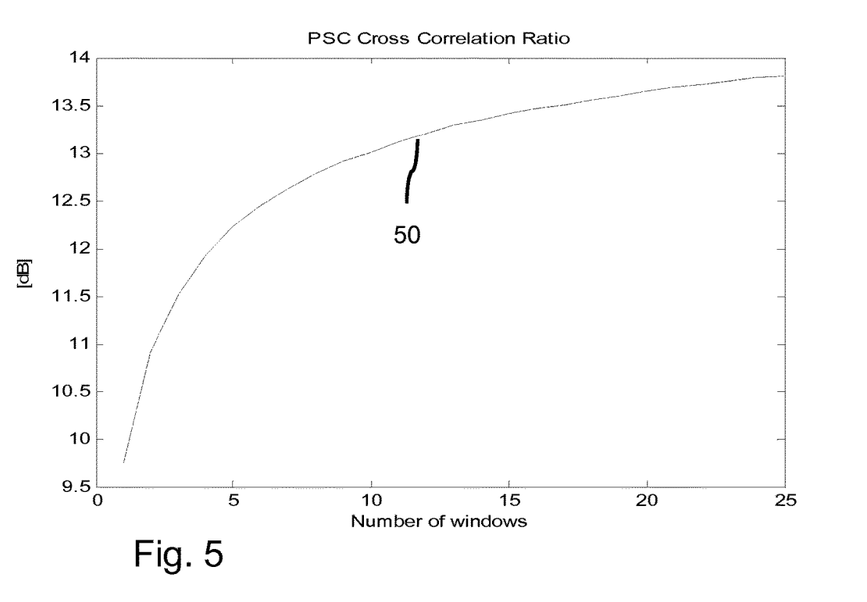
FIG. 5 shows an example of the Primary Scrambling Code cross correlation ratio versus a number of windows.

FIG. 5 shows an example of the Primary Scrambling Code cross correlation ratio versus a number of windows. In a graph a number of windows is set along the horizontal axis, and the PSC cross correlation ratio in dB along the vertical axis. The curve 50 depicts the effective cross correlation. Based on the Figure can be seen that the number of windows must be more than about 5 to not decrease the cross correlation by more than 1.5 dB. Between 5 and 25 windows, the ratios present a difference of approximately 1.5 [dB] and the arithmetic complexity is reduced 5 times. It can be considered a good compromise given that CPICH power is slightly higher than the power of sync channels. Also, scrambling codes have better correlation properties than sync codes (due to length and generation mode).

Without any information regarding power control or ADC gain, the threshold can't be chosen as an absolute value—it is set relative to the other correlations. The third stage threshold may be chosen in the same manner as second stage threshold. Comparing the maximum correlation from one group only with the other 7 correlation values from the same group may be insufficient and may lead to undetected peaks or having to choose a higher threshold weighting factor to ensure no false detects in the last stage.

The initial approach to the third stage threshold was that for every group, the maximum correlation would be compared with the average of the other 7 correlation values. A weighting coefficient may be determined in practice to get the maximum ratio for a false detect. Adding a safety guard to the maximum false detect ratio (multiply with a coefficient) will give the third threshold. Optionally, one threshold for all third stage correlation values is based on an overall average, not a local average.

On the other hand, because of the frequency offset, the window has to be chosen as small as possible to avoid canceling sums due to phase wrap.

Figure 6:
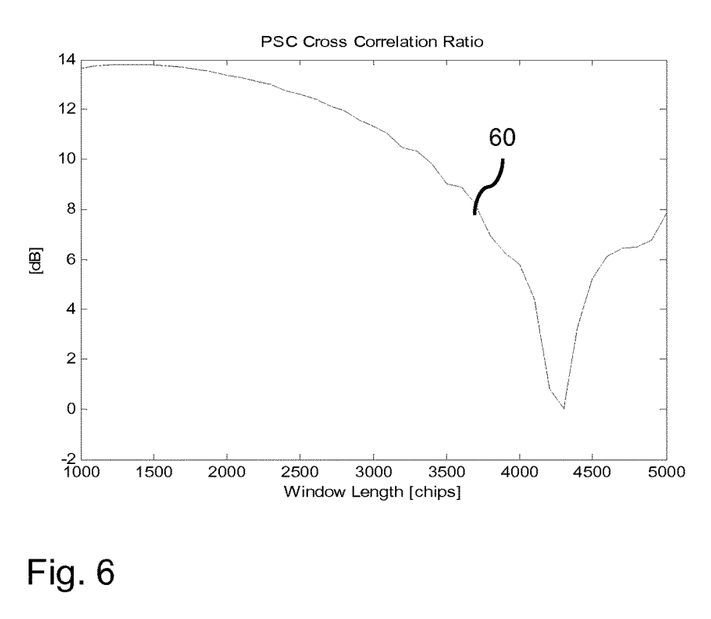
FIG. 6 shows a cross correlation ratio versus the length of partial correlation windows.

A good compromise can be found based on the practical conditions. For a series of window lengths (in the range of 1000 to 5000 chips) and given an offset frequency of 900 Hz the minimum value of the following ratio is computed for a set of scrambling code pairs:

$$CR = \frac{r_{xx}(0)}{\max(r_{xy}(n))}; n = \overline{0.38399}$$

Where:
$r_{xx}(0)$ is the maximum cross-correlation of scrambling code x with scrambling code x having 900 Hz frequency offset.
$\max(r_{xy}(n))$ is the maximum cross-correlation of scrambling code x with scrambling code y having 900 Hz frequency offset at n chip delay.

FIG. 6 shows a cross correlation ratio versus the length of partial correlation windows. In a graph, window lengths are set along the horizontal axis, and the PSC cross correlation ration in dB along the vertical axis. The curve 60 depicts the effective cross correlation for a practical value of frequency offset. The figure shows how the cross correlation ratio is influenced by window length. Based on this the optimum size is chosen. Based on the Figure can be seen that the window size must be less than about 2500 chips to not decrease the cross correlation by more than 1 dB.

It is noted that for a search procedure for multiple base stations it is important to choose the thresholds for detecting correlation peaks, i.e. a compromise between speed and number of detects. There are two distinct approaches in this area. Either set high thresholds and detect only a few NodeBs very fast or lower thresholds to detect everything possible. In the first method, it is very important to find the threshold that has very few false detects while not missing any obvious peaks. For both methods, focus is on reducing arithmetic complexity. Optionally, the actual implementation may have one or more controllable parameters that set the algorithm anywhere between the two extremes. This enables integration in a higher level application that needs such flexibility for optimizing resource management. For example: when connecting to the network, start an initial fast cell search to quickly determine the closest BSs and to be able to perform other functionalities, then start a more extensive search that runs in background. Optionally, the search doesn't run in real time, and the antenna signal is stored in a buffer and analyzed afterwards (offline cell search).

Figure 7:
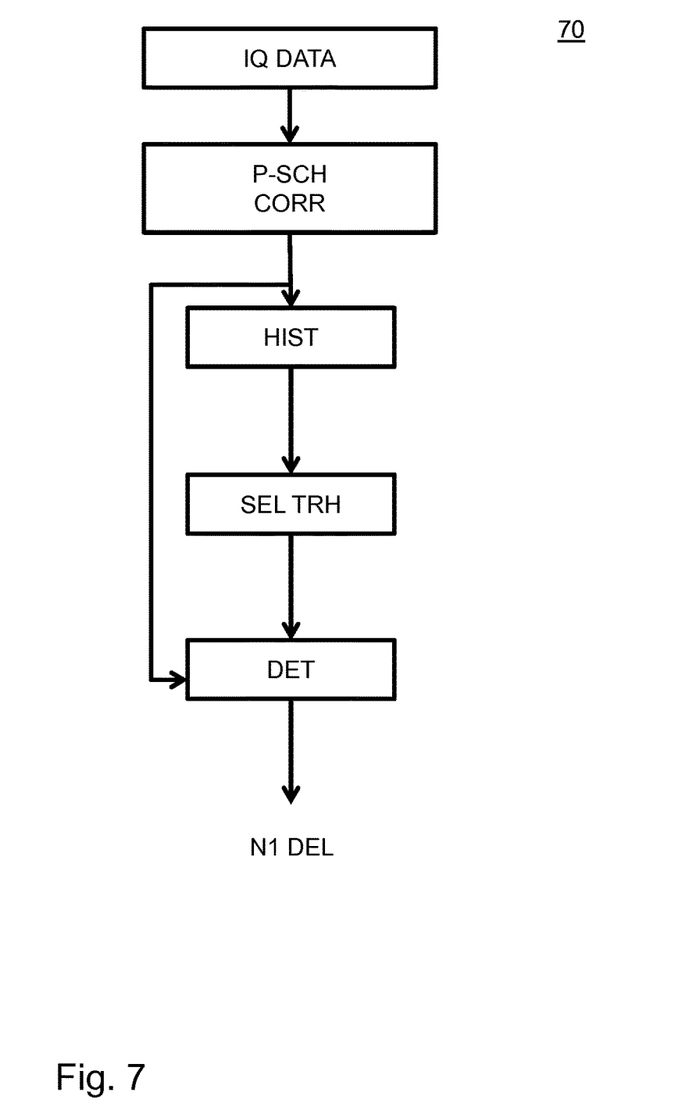
FIG. 7 shows an example of a first stage of a cell search procedure.
Figure 8:
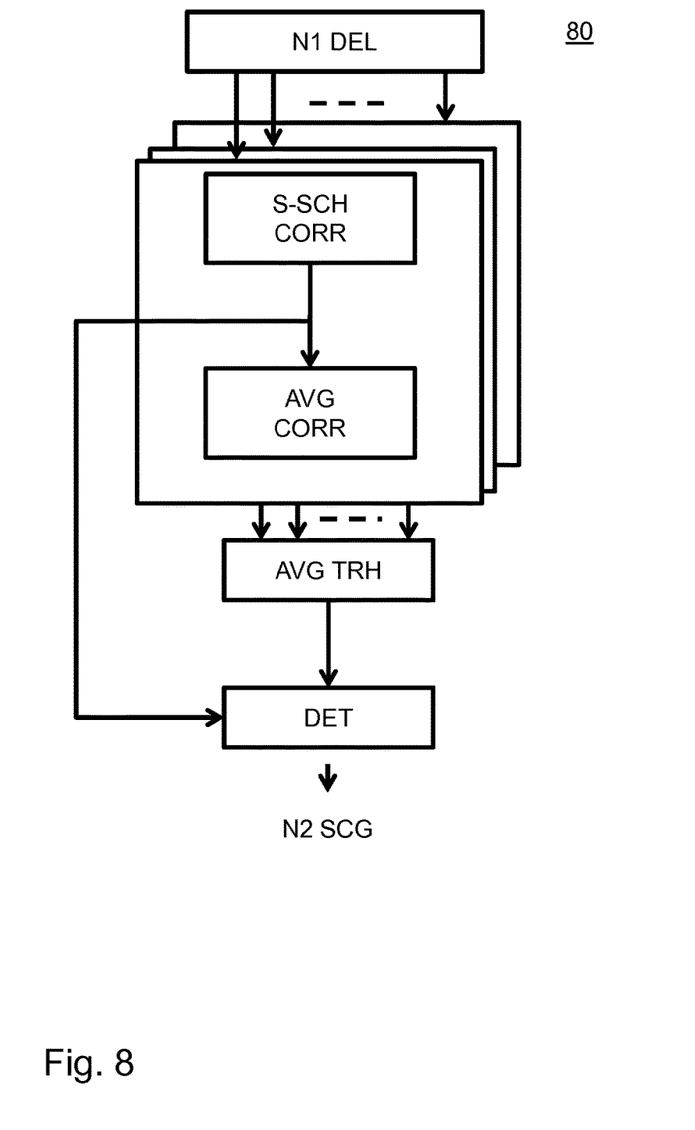
FIG. 8 shows an example of a second stage of a cell search procedure.
Figure 9:
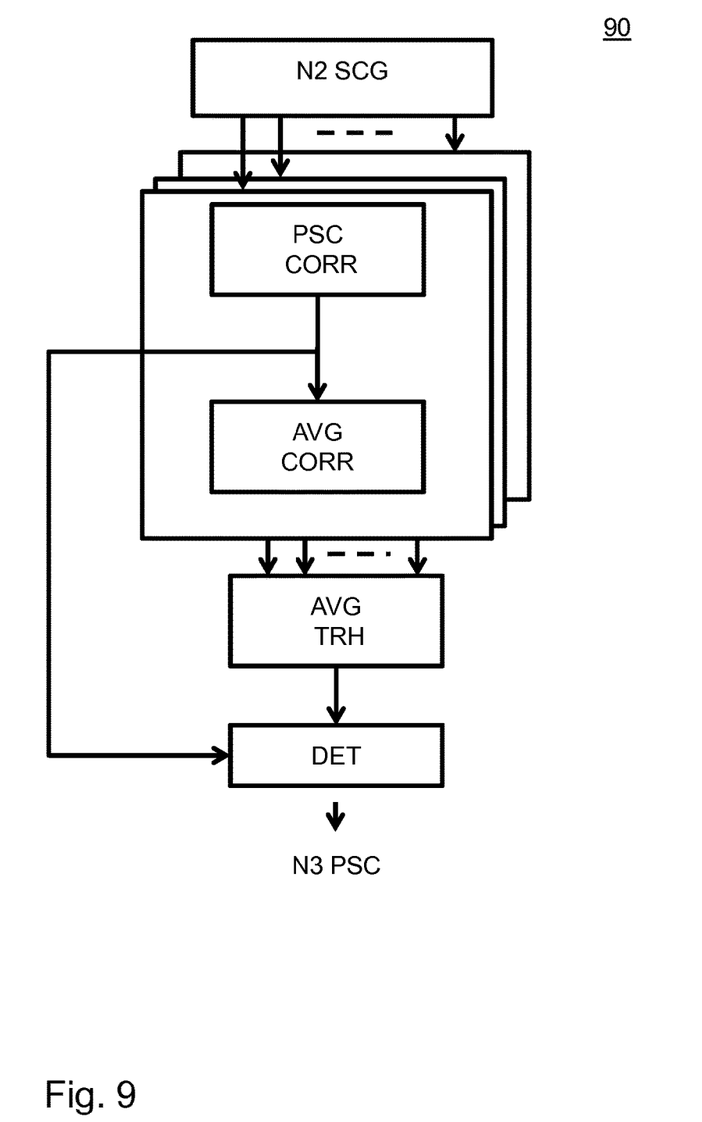
FIG. 9 shows an example of a third stage of a cell search procedure.

In summary, in a base station cell search, the procedure may involve the following steps, applied on a WCDMA frame, as shown in the FIGS. 7, 8 and 9.

FIG. 7 shows an example of a first stage of a cell search procedure. In a flow diagram a first stage 70 involves the following for slot boundary detection. Input data is received at the step IQ DATA. Subsequently a correlation with the P-SCH code is computed in step P-SCH CORR. Next, a histogram is generated as described above in step HIST. Next, a threshold is computed in step SEL TRH using the histogram. Next, any delay of local maximum correlation values above threshold is detected in step DET. This takes into account multi-path propagation and the fact that one detected path per NodeB suffices. The output of the first stage is a set of delay values N1 DEL, which are provided to the second stage.

FIG. 8 shows an example of a second stage of a cell search procedure. In a flow diagram a second stage 80 involves the following for frame boundary detection. Input data N1 DEL is received from the first stage. Subsequently a correlation with the S-SCH code-words is computed in step S-SCH CORR. Next, for each delay found in previous step, an average is computed of all correlations with S-SCH code words in step AVG CORR. Next a threshold is computed in step AVG TRH based on all averages computed in previous step. Next any delay of correlation values above the threshold is detected in step DET using the second threshold to find frame synchronization and code group. The output of the second stage is a set of scrambling code groups N2 SCG, which are provided to the third stage.

FIG. 9 shows an example of a third stage of a cell search procedure. In a flow diagram a third stage 90 involves the following for primary scrambling code detection. Input data N2 SCG is received from the second stage. Subsequently, for each frame boundary and SCG, 8 correlations with the PSC's in the group are computed in step PSC CORR. Correlation may be computed using a number of windows of predefined length. Next, an average is computed of all correlations with PSC in step AVG CORR. Next, a threshold is computed in step AVG TRH based on all averages computed in previous step. Next, correlation values above the threshold are detected in step DET using the third threshold to find frame synchronization and code group. The output of the third stage is a set of scrambling codes/frame boundaries N3 PSC, which are the identified base stations having the NodeB scrambling codes.

Figure 10:
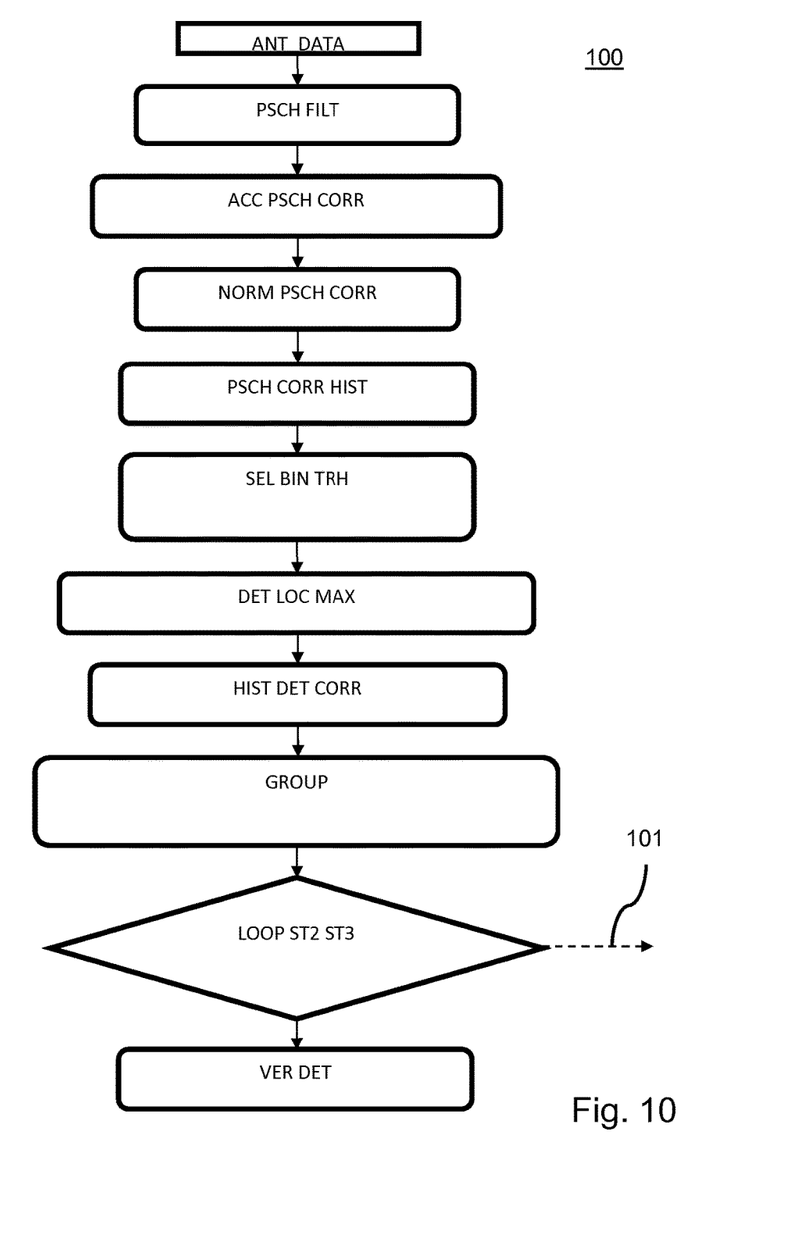
FIG. 10 shows a further example of a first stage of a cell search procedure.

FIG. 10 shows a further example of a first stage of a cell search procedure. In a flow diagram a first stage 100 involves the following. Antenna data as Input data is received at the step ANT DATA. Subsequently, a correlation with the P-SCH code is computed via matched filters in step P-SCH FILT. Next, step ACC PSCH CORR accumulates the PSCH correlation over N slots. Next, step NORM PSCH CORR normalize the PSCH correlation values. Next, step PSCH CORR HIST computes the PSCH correlation histogram. Next, step SEL BIN TRH finds the histogram bin with least hits and computes the corresponding first threshold. Next, step DET LOC MAX detects the correlation local maximums that are above the first threshold. Next, step HIST DET CORR computes a histogram of detected correlations. Next, step GROUP organizes the first stage detects in groups of fixed length in order of their correlation value, which achieves a rough sort. Now the resulting group data are provided to a loop for every group involving the second and third stage, as indicated by arrow 101, which connects to the next flow diagram depicted in FIG. 11. Finally, when the detection results of the third stage are received, in step VER DET, the detects of the third stage are double checked by correlating with the primary scrambling code PSC.

Figure 11:
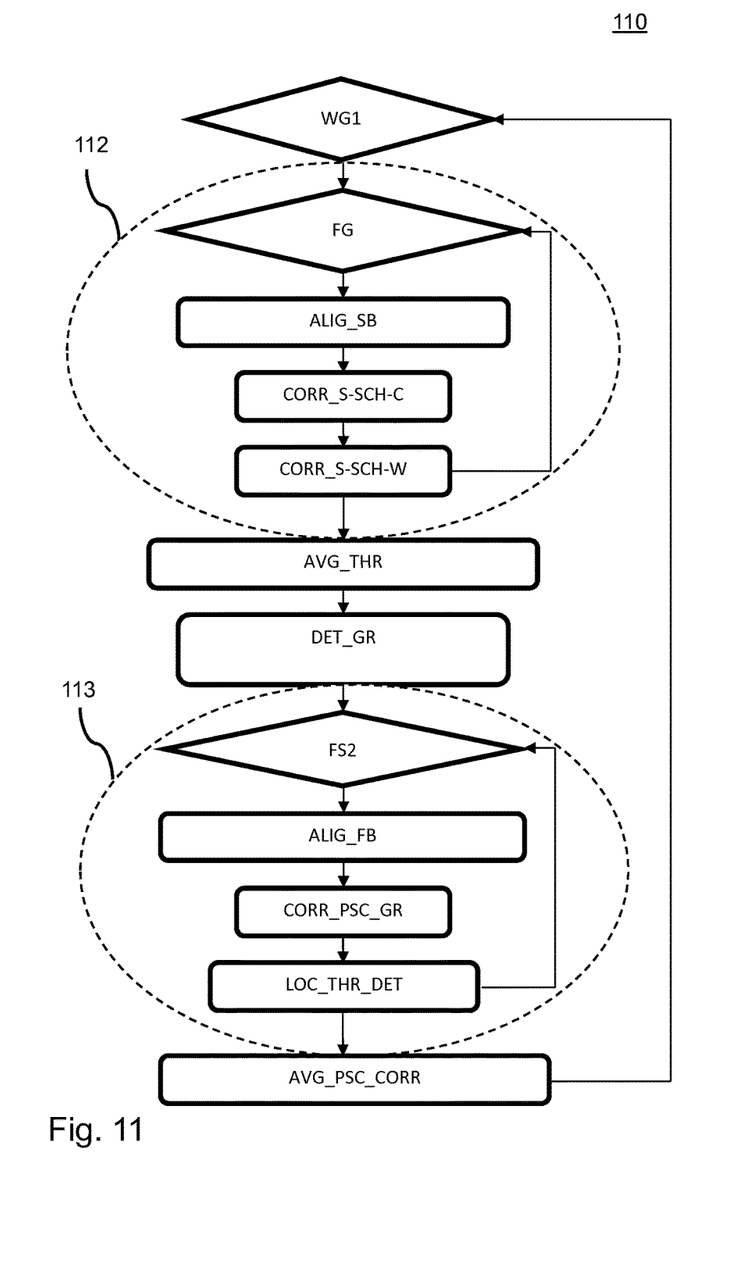
FIG. 11 shows a further example of a second and third stage of a cell search procedure.

FIG. 11 shows a further example of a second and third stage of a cell search procedure. In a flow diagram 110 a second stage 112 and third stage 113 involve the following. Detected group data as input data is received from the first stage as shown in FIG. 10 by arrow 101 at the step WG1 while any first stage groups left. Subsequently, a loop is started in the second stage 112 at step FG for every detect in a group. Next in the loop, step ALIG_SB aligns the input signal to the slot boundary according to detected delay. Next in the loop, step CORR_S-SCH-C compute S-SCH codes correlation. Next in the loop, step CORR_S-SCH-W computes S-SCH code-words correlations. When the loop finalizes, step AVG-THR averages all S-SCH words correlations and computes, respectively updates a second threshold. Next, step DET_GR detects SSCH word correlations above the second threshold. Optionally, the results are grouped similar to the first stage.

Subsequently, the procedure proceeds to the third stage 113. A loop is started for every second stage detect at step FS2. In the loop, step ALIG_FB aligns the input signal to the frame boundary according to detected delay. Next in the loop, step CORR_PSC_GR computes PSC group correlations. Next in the loop, step LOC_THR_DET computes a local threshold and detects the PSC. Finally, when the third stage loop terminates, step AVG_PSC_CORR averages all PSC correlations and may compute or update the second threshold. The procedure now proceeds to process the next group at step WG1, or terminates by reporting the detected base stations.

Optionally, in the above method, in the first stage, correlation values are determined by accumulating correlations corresponding to a same in-slot delay. Accumulating increases the accuracy of the correlation.

Optionally, in the first stage, the bins of correlation values have widths corresponding to $2^n$, n being an integer larger than 1, and the correlation values are assigned to the respective bins by right shifting with n bits. Such selected widths reduce the required computation.

Optionally, in the first stage, adjacent correlation values above the first threshold are grouped, and a highest correlation value in such group is processed. Such a group may be generated by a single base station, and the best correlation value is used.

Optionally, in the second stage, the second threshold value is based on a weighted average of the correlation values of the secondary synchronization channel (SSCH) code groups corresponding to selected possible base station slot boundaries corresponding to delay hits above the first threshold.

Optionally, the second stage comprises taking a soft decision by determining a correlation table for every SSCH code and all possible frame delays using the slot aligned input signal, and using the correlation table, selecting the code words and frame delays with a correlation value above the second threshold for processing in the third stage. Taking the soft decision may comprise computing the correlation value with every SSCH code for every slot and subsequently forming a correlation matrix by accumulating correlations for every code-word and every delay so as to calculate the correlation between a code word and a slot only once.

The third stage may include determining a correlation with a primary scrambling code (PSC) on a common pilot channel (CPICH) for detecting each respective one of said multiple base stations. Finally determining the PSC correlation verifies the actual presence of the signals of the corresponding base station.

Optionally, the third stage comprises determining the correlation values based on a non-coherent correlation scheme by non-coherent accumulation computed on multiple windows. The non-coherent correlation scheme may use partial correlation, e.g. for accommodating frequency differences as described above. For such windows, the window size may be determined, while using scrambling codes that are pseudo-random codes, on one hand as wide as possible so as to avoid cross-correlation between such scrambling codes, and on the other hand, as small as possible to avoid canceling sums due to phase wrap due to possible frequency offset between clocks in the base station and the receiving station. In practice, the window size may be determined to be in the range of 1000 to 5000 chips, while using a code having 38400 chips. Furthermore, the window size may be determined to cover an integer number of symbols. The length of the symbol, may be 256 chips, which corresponds to the length of the CPICH channelization code. This may reduce computational load when later determining the values of such symbols, because correlation values have already been calculated. In a practical example, the window size may be set to 1536 chips.

Optionally, the first and/or second threshold are adapted for a first operational mode for enabling a relatively fast search for determining a nearby base station, and a second operational mode for enabling a relatively extensive search for determining a multitude of base stations. The first operational mode may be a startup mode, where it is required to connect to just one, preferably the strongest, base station. This mode is similar to a User Equipment search. However, if the search is performed by the NodeB it's not for connection purposes; a base station may search for other base stations in order to not interfere with them and be able to do a hand over procedure without having prior information regarding radio network planning, i.e. in a self organized network. Subsequently, in the second operational mode, e.g. for normal use, all base stations in reach are to be found.

The above cell search procedure may be implemented in any radio device that needs to communicate to multiple base stations. Such device is required to search for multiple base stations in a mobile communication system. The device is arranged to perform the method according to any of the above described embodiments. For example, the device is a base station (such as BS1 in FIG. 1). Also, the device may be a semiconductor device for a communication device. Also, the device may be a receiver comprising a programmable processor, the programmable processor being arranged to execute a program code comprising instructions for causing the programmable processor to perform the method. Also, the receiver may comprise a semiconductor circuitry, the semiconductor circuitry being specially designed to execute the above method.

Optionally, the program code may be provided on a computer readable medium, also called a medium comprising a computer program product, the computer program product comprising instructions for causing a processor apparatus to perform the above cell search method. The computer program product may further comprise instructions for causing a processor apparatus to perform other processing stages of the receive chain, such as frequency domain processing. The computer program product may be embodied on a computer readable medium as physical marks or by means of magnetization of the computer readable medium, e.g. an optical disc, a hard disk, solid state memory, flash memory, etc., and may be non-recordable or recordable.

The invention may thus also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Some of the above embodiments, as applicable, may be implemented using a variety of different information processing systems. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Also, devices functionally forming separate devices may be integrated in a single physical device. Also, the units and circuits may be suitably combined in one or more semiconductor devices.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method for searching of base stations in a mobile communication system, the method comprising:
    detecting at least one slot boundary at a first stage of detecting, wherein said detecting the at least one slot boundary comprises:
        correlating an input signal with a primary synchronization channel code and detecting at least one correlation peak,
        determining a first threshold based on a histogram of bins of correlation values of said correlating the input signal with the primary synchronization channel code, wherein a bin above an average of all correlation values and that has zero or a minimum of delays of correlation values is used to set the first threshold, and
        selecting the possible base station slot boundaries corresponding to delays of correlation values above the first threshold;
    detecting at least one frame boundary, at a second stage of detecting, in accordance with a frame delay and a scrambling code group, wherein said detecting the at least one frame boundary comprises:
        correlating a slot aligned input signal aligned to the detected slot boundary with secondary synchronization channel (SSCH) codes for combining the SSCH codes into code words,
        correlating multiple SSCH sequences at multiple possible frame delays for identifying frame boundaries and identifying a code group by the respective SSCH sequence,
        for each of said delays of correlation values above the first threshold,
        aligning the input signal to the corresponding slot boundary,
        computing an average correlation value based on all correlations with said SSCH sequences, and
        setting a second threshold based on the average correlation value; and
    detecting a scrambling code in a third stage of detecting, wherein said detecting the scrambling code comprises:
        correlating a frame aligned input signal aligned to the frame boundary with the codes in the code group as identified at the second stage, and
        processing any delay and codeword of the scrambling code that have a correlation value above the second threshold for computing the correlation with the codes in the detected group so as to detect multiple base stations.

2. The method as claimed in claim 1, wherein, in the first stage, correlation is computed via two cascaded filters, each filter having a predetermined number of filter coefficients.

3. The method as claimed in claim 2, wherein each filter has 16 filter coefficients.

4. The method as claimed in claim 1, further comprising weighting first threshold so that it is configurable for extensive or fast search.

5. The method as claimed in claim 1, wherein, in the first stage, the bins of correlation values have widths corresponding to 2n, n being an integer larger than 1, and the correlation values are assigned to the respective bins by right shifting with n bits.

6. The method as claimed in claim 1, wherein, in the first stage, adjacent correlation values above the first threshold are grouped, and a highest correlation value in such group is processed.

7. The method as claimed in claim 1, wherein, in the second stage, the second threshold value is, for being configurable for extensive or fast search, based on a weighted average of the correlation values of the secondary synchronization channel code groups corresponding to selected possible base station slot boundaries corresponding to delays of correlation values above the first threshold.

8. The method as claimed in claim 1, further comprising:
    basing the second threshold value on a histogram of bins of correlation values;
    determining a bin above an average of all correlation values that has zero or a minimum of delays of correlation values; and setting the second threshold according to the determined bin.

9. The method as claimed in claim 1, further comprising:
taking a soft decision by determining a correlation table for every SSCH code and all possible frame delays using the slot aligned input signal; and
using the correlation table, selecting the code words and frame delays with a correlation value above the second threshold for processing in the third stage.

10. The method as claimed in claim 9, wherein taking the soft decision comprises:
computing the correlation value with every SSCH code for every slot; and
subsequently forming a correlation matrix by accumulating correlations for every code-word and every delay so as to calculate the correlation between a code word and a slot only once.

11. The method as claimed in claim 1, further comprising:
computing an average correlation value based on all correlations with said codes in the detected group; and
setting a third threshold based on the average correlation value.

12. The method as claimed in claim 1, wherein said detecting the scrambling code comprises at least one of
determining a correlation with a primary scrambling code on a common pilot channel for detecting each respective one of said multiple base stations;
determining the correlation values based on a non-coherent correlation scheme by non-coherent accumulation computed on multiple windows.

13. The method as claimed in claim 12, wherein the window size of the multiple windows is determined, while using scrambling codes that are pseudo-random codes, on one hand as wide as possible so as to avoid cross-correlation between such scrambling codes, and on the other hand, as small as possible to avoid canceling sums due to phase wrap due to possible frequency offset between clocks in the base station and the receiving station.

14. The method as claimed in claim 13, wherein the window size is determined to, at least one of
be in the range of 1000 to 5000 chips, while using a code having 38400 chips;
cover an integer number of symbols;
be 1536 chips.

15. The method as claimed in claim 1, wherein one or more of the first and second threshold are adapted for a first operational mode for enabling a relatively fast search for determining a nearby base station, and a second operational mode for enabling a relatively extensive search for determining a multitude of base stations.

* * * * *